(12) United States Patent
Rodgers et al.

(10) Patent No.: US 9,152,577 B2
(45) Date of Patent: Oct. 6, 2015

(54) SECURITY CENTRAL PROCESSING UNIT MANAGEMENT OF A TRANSCODER PIPELINE

(71) Applicant: Broadcom Corporation, Irvine, CA (US)

(72) Inventors: Stephane Rodgers, San Diego, CA (US); Andrew Dellow, Minchinhampton (GB); Shashank Shekhar, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 258 days.

(21) Appl. No.: 13/707,070

(22) Filed: Dec. 6, 2012

(65) Prior Publication Data

US 2014/0053001 A1 Feb. 20, 2014

Related U.S. Application Data

(60) Provisional application No. 61/684,492, filed on Aug. 17, 2012, provisional application No. 61/729,100, filed on Nov. 21, 2012.

(51) Int. Cl.
| | |
|---|---|
| *H04N 21/4408* | (2011.01) |
| *H04N 21/4402* | (2011.01) |
| *H04N 19/40* | (2014.01) |
| *G06F 12/14* | (2006.01) |
| *G06F 21/00* | (2013.01) |
| *H04N 21/2343* | (2011.01) |
| *H04N 7/167* | (2011.01) |
| *H04N 19/423* | (2014.01) |
| *H04N 19/46* | (2014.01) |

(52) U.S. Cl.
CPC ........ *G06F 12/1408* (2013.01); *G06F 12/1441* (2013.01); *G06F 21/00* (2013.01); *H04N 7/1675* (2013.01); *H04N 19/40* (2014.11); *H04N 19/423* (2014.11); *H04N 21/234309* (2013.01); *H04N 21/4402* (2013.01); *H04N 21/4408* (2013.01); *H04N 19/46* (2014.11)

(58) Field of Classification Search
CPC .......... H04N 21/4408; H04N 21/4402; H04N 19/40; H04N 19/423; H04N 19/433; H04N 7/1675; G06F 12/1408; G06F 12/1441
USPC ....................................................... 713/193
See application file for complete search history.

(56) References Cited

U.S. PATENT DOCUMENTS

| | | | | |
|---|---|---|---|---|
| 6,167,521 | A * | 12/2000 | Smith et al. | 726/21 |
| 6,201,871 | B1 * | 3/2001 | Bostley et al. | 380/249 |
| 7,434,263 | B2 * | 10/2008 | Lampson et al. | 726/27 |

(Continued)

*Primary Examiner* — Eleni Shiferaw
*Assistant Examiner* — Nelson Giddins
(74) *Attorney, Agent, or Firm* — Brinks Gilson & Lione (57) ABSTRACT

A method for managing a transcoder pipeline includes partitioning a memory with a numbered region; receiving an incoming media stream to be transcoded; and atomically loading, using a security central processing unit (SCPU), a decryption key, a counterpart encryption key and an associated region number of the memory into a slot of a key table, the key table providing selection of decryption and encryption keys during transcoding. The atomically loading the decryption and encryption keys and the associated numbered region ensures that the encryption key is selected to encrypt a transcoded version of the media stream when the media stream has been decrypted with the decryption key and the transcoded media stream is retrieved from the associated numbered region of the memory.

19 Claims, 4 Drawing Sheets

(56) References Cited

U.S. PATENT DOCUMENTS

| | | | |
|---|---|---|---|
| 7,536,558 B2* | 5/2009 | Neble et al. | 713/189 |
| 7,930,360 B2* | 4/2011 | Sibert | 709/216 |
| 7,940,932 B2* | 5/2011 | Paksoy et al. | 380/247 |
| 8,024,521 B2* | 9/2011 | Bates et al. | 711/118 |
| 8,146,167 B2* | 3/2012 | Inooka et al. | 726/27 |
| 8,239,673 B2* | 8/2012 | Shankar et al. | 713/164 |
| 8,327,125 B2* | 12/2012 | Zhang et al. | 713/2 |
| 8,424,099 B2* | 4/2013 | Fahrny | 726/26 |
| 8,438,401 B2* | 5/2013 | Milliken | 713/189 |
| 8,625,788 B2* | 1/2014 | Pendakur et al. | 380/200 |
| 8,799,678 B2* | 8/2014 | Buer | 713/190 |
| 2003/0131228 A1* | 7/2003 | Twomey | 713/153 |
| 2004/0015958 A1* | 1/2004 | Veil et al. | 717/174 |
| 2005/0086419 A1* | 4/2005 | Neble et al. | 711/100 |
| 2006/0036853 A1* | 2/2006 | Chen et al. | 713/161 |
| 2006/0129848 A1* | 6/2006 | Paksoy et al. | 713/193 |
| 2008/0205651 A1* | 8/2008 | Goto et al. | 380/277 |
| 2008/0267411 A1* | 10/2008 | Peterka et al. | 380/279 |
| 2009/0031143 A1* | 1/2009 | Hodzic | 713/193 |
| 2009/0119541 A1* | 5/2009 | Inoue et al. | 714/10 |
| 2011/0072279 A1* | 3/2011 | Milliken | 713/194 |
| 2011/0161645 A1* | 6/2011 | Zhang et al. | 713/2 |
| 2011/0191599 A1* | 8/2011 | Chou et al. | 713/193 |
| 2011/0202729 A1* | 8/2011 | Bohizic et al. | 711/141 |
| 2011/0202776 A1* | 8/2011 | Chen et al. | 713/193 |
| 2012/0109875 A1* | 5/2012 | Sundaram et al. | 707/600 |
| 2012/0131351 A1* | 5/2012 | Balinsky et al. | 713/189 |
| 2012/0173877 A1* | 7/2012 | Pendakur et al. | 713/169 |
| 2013/0275656 A1* | 10/2013 | Talagala et al. | 711/103 |
| 2013/0282951 A1* | 10/2013 | Kuo et al. | 711/102 |
| 2014/0129827 A1* | 5/2014 | Khosravi et al. | 713/156 |
| 2015/0095600 A1* | 4/2015 | Bahnsen et al. | 711/163 |

* cited by examiner

SECURITY CENTRAL PROCESSING UNIT MANAGEMENT OF A TRANSCODER PIPELINE

CROSS REFERENCE TO RELATED APPLICATIONS

This application claims the benefit of priority from U.S. Provisional Application No. 61/684,492, filed Aug. 17, 2012, and U.S. Provisional Application No. 61/729,100, filed Nov. 21, 2012, which are incorporated herein by reference.

TECHNICAL FIELD

This disclosure relates to system security performed by a security central processing unit (SCPU), and more particularly, to security CPU management of a transcoder pipeline.

BACKGROUND

Rapid advances in electronics and communications technologies, driven by consumer demand, have resulted in the widespread adoption of data-driven devices, including those for handling and converting third party media content. Third party media providers (such as cable companies) want their content handled with security such that the content is not copied or used outside of certain permission levels.

BRIEF DESCRIPTION OF THE DRAWINGS

The systems and methods may be better understood with reference to the following drawings and description. In the figures, like reference numerals designate corresponding parts throughout the different views.

DETAILED DESCRIPTION

The discussion below makes reference to system security performed by a security central processing unit (SCPU), and more particularly, to security CPU management of a transcoder pipeline. The SCPU may be instantiated on a system on a chip (SOC) such as may be used in a set top box (STB) for streaming media to consumers. Such media may include audio or audio/video content viewable by consumers on media devices.

Transcoding may be the direct digital-to-digital data conversion of one encoding to another, such as for movie data files or audio files. This may be done in cases where a target device (or workflow) does not support the format or has limited storage capacity that calls for a reduced file size, or to convert incompatible or obsolete data to a better-supported or modern format. Transcoding may be performed just while files are being searched, as well as for presentation. Transcoding is common in mobile devices to adapt content for display on different devices or for transmission or storage under constrained bandwidth availability. For instance, Multimedia Messaging Service (MMS) is the technology used to send or receive messages with media (image, sound, text and video) between mobile phones. Transcoding also occurs in set top boxes and other digital media receivers that receive movies, images and sounds from different media providers and transcode various formats to those displayable on consumer devices.

In a SOC, a transcoder pipeline may be used to transcode a media stream from one digital format to another digital format and/or from one bit rate to a different bit rate. A media stream may include audio or of audio and video. For example, a transcoder may receive an MPEG (Motion Picture Experts Group) media stream at 18 MB/S (megabits per second) and transcode the media stream to output an AVS (Audio Video Standard) stream at 8 MB/s.

There may be several stages to a transcoder pipeline. Because media content is often encrypted to protect from unauthorized copying, the transcoder process may begin with decryption and end with encryption of a transcoder stream. Between stages, the media stream may be stored into memory to be read out by another stage. Because of a complexity of the steps and reading the media stream in and out of memory, risks exist that third parties having access to a host processor of the SOC may access and copy the media stream without permission. This may occur as the media stream is encrypted again after being transcoded, and just before being streamed to a consumer media device. Accordingly, it may be desirable to have the SCPU manage the transcoder pipeline, both the tracking of the media stream through the multiple transcoder stages, and the use of decryption and encryption keys.

A key table may be stored in memory that provides for the selection of a decryption key used at the beginning of the transcoder pipeline and the selection of the correct encryption key to re-encrypt the media stream at the end of the transcoder pipeline. A host processor would normally handle transcoding because the transcoding process is resource-intensive and the SCPU may be small and dedicated to high security functions. A risk exists that a third party having access to the host processor may manipulate the selection process of the encryption key so that the third party may misappropriate the transcoded media stream without permission.

A one-SCPU or a two-SCPU system may be implemented to manage the transcoder pipeline during transcoding to mitigate the risks of third party misappropriation of the media stream if managed by the host processor of the SOC. Using a multi-security CPU approach, a small SCPU may be dedicated for highly secure functions, while a larger intermediate level SCPU may be used for lower security tasks, like digital rights management (DRM), managing transcoding, watermarking, etc. As discussed herein, the small SCPU is labeled security CPU-A, and the larger intermediate security level SCPU is labeled security CPU-B.

Accordingly, the security CPU-B may be used to manage the transcoder pipeline or both the security CPU-B and CPU-A may be used to manage the transcoder pipeline. If a two-security CPU system is used, the security CPU-B may be configured to handle the majority of the transcoder management and the security CPU-A may be configured to handle writing to the key table so that this function is performed by a highly secure SCPU. Additional numbers of SCPUs may also be employed depending on how functionality is separated among the multiple SCPUs.

Figure 1:
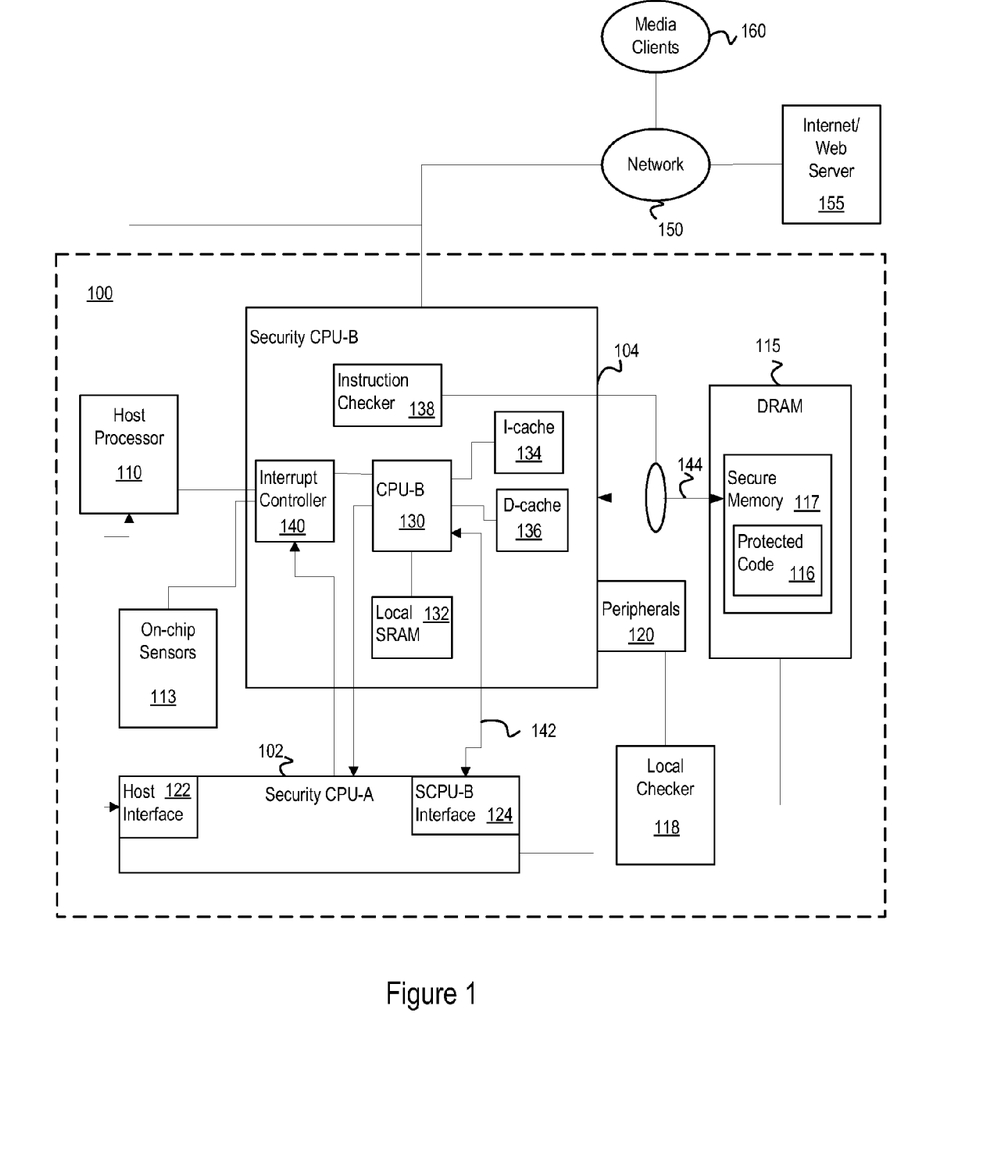
FIG. 1 is a diagram of an exemplary multi-security central processing unit (CPU) system on a chip.

FIG. 1 is an example diagram of a multi-security central processing unit (SCPU) system on a chip (SOC) 100. The system 100 may include first SCPU 102 also referred to as security CPU-A, second SCPU 104 also referred to as CPU-B, and a host processor 110, the general-purpose processor that runs the majority of the chip operation. The security CPU-A may be smaller than the security CPU-B and be configured to operate at a first security level higher than a second security level at which security CPU-B operates. The security CPU-B may be provided a higher trust level than the host processor 110 and the host processor may be denied execution of the second security level functions.

Functions of security CPU-A at the first security level may include, for example, managing root keys, performing an initial secure boot, routing secrets of a third party content provider and writing encryption and decryption keys to a key table for transcoder management. Functions of security CPU-B at the second security level include, for example, digital rights management, license management, transcoder management, watermarking, and manipulation of data in secure memory. The security CPU-A may be configured with software code that treats commands from the security CPU-B as privileged, and that generates multiple unique commands for execution by the security CPU-B that are not executable by the host processor 110.

As configured to perform the majority of the processor-intensive security functions, the security CPU-B may be nearly as powerful as the host processor 110 in some implementations, and may, for instance, perform up to 1,000 or 1,500 or more Dhrystone million instructions per second (DMIPS). As such, the security CPU-B may be more focused on lower security functions. Security CPU-A may need a fraction of the power and operate at less than 1,000 DMIPS.

The system 100 may further include on-chip sensors 113, memory such as dynamic random access memory (DRAM) 115, a local checker 118 coupled with the security CPU-A and multiple peripherals 120 of the security CPU-B. "Coupled with" herein can mean to be directly connected to a component or indirectly connected through one or more components. The DRAM 115 may include a portion of which is protected code 116 stored in secure memory 117. The secure memory 117 may be partitioned into specific or identified regions of the DRAM.

The security CPU-A may include a host interface 122 to communicate with the host processor 110 and an SCPU-B interface 124 with which to communicate with the security CPU-B. The security CPU-B may include a CPU-B 130, a local static random access memory (SRAM) 132, an instruction cache (i-cache) 134, a data cache (d-cache) 136, an instruction checker 138 and an interrupt controller 140. The local SRAM 132 may be private local memory for access by the security CPU-B in which instructions may be saved and data temporarily stored that is not accessible to the host processor 110 or to other on-chip entities or clients.

The security CPU-B and the security CPU-A may be coupled together with a dedicated, secure communications bus 142 that operates as a private channel between the CPU-B 130 and the security CPU-A. The secure communications bus 142 may be inaccessible by the host processor and inaccessible by third party clients programmed on the SOC system 100. The secure communications bus 142 may be configured with a combination of hardware and firmware and perform a master slave relationship in which, in some operations, the security CPU-A is either the master of or slave to the security CPU-B. For instance, the security CPU-A may be the master of booting CPU-B securely in memory. But, the security CPU-A may also receive commands from security CPU-B or the local checker 118, for instance.

The system 100 may further include a common register bus 144 to which third-party clients programmed on the SOC have access. The common register bus 144 may be used to write into registers of the memory 115. The security CPU-A may be configured to prevent certain on-chip clients from stopping security CPU-B from operating as intended, as disclosed herein.

The local checker 118, which may be coupled with the security CPU-A and security CPU-B, may be a piece of hardware configured to guarantee access by the security CPU-B to the common register bus 144 and to the DRAM and to prevent on-chip, third-party clients programmed on the SOC from accessing certain regions of the DRAM.

The security CPU-A may also program the local checker 118 to ensure internal peripherals 120 of the security CPU-B are inaccessible by third party entities with access to the host processor 110. The peripherals may include, but not be limited to, a Universal Asynchronous Receiver/Transmitter (UART), a timer, an interrupt, memory, data storage, a media device or a combination thereof.

The instructions checker 138 may monitor instructions to be executed out of the DRAM and determine whether instructions called for execution from the secured memory by a component are cleared for execution by that component. To clear instructions for execution, the instruction checker 138 may ensure that the security CPU-B does not operate outside of regions of the secure memory 117 that has been authenticated for secure operation or conditional access by the host processor 110. For example, the instruction checker may monitor reads and writes to the DRAM 115 and compare the DRAM addresses of those memory accesses with an address range set up by the security CPU-A as a pre-authenticated region for execution of the instructions. If the security CPU-B attempts to execute instructions outside of the region of memory, the security CPU-B may be rebooted or the entire SOC be reset.

In one example, the content saved to the secure memory 117 may include media content that a client does not want distributed in an unauthorized manner. The security CPU-B may decrypt the content for viewing on a consumer device, but not allow other peripherals to access or distribute the content outside of the system 100. The security CPU-B may ensure a consumer may view the content but not be directly accessed by the host. The security CPU-A and CPU-B may set up hardware that limits certain chip components in their access to the secure memory 117. For example, the security CPU-A and security CPU-B may make a region of memory off limits to the host processor. Furthermore, the security CPU-B may perform watermarking or manipulate time stamps with regards to content that a consumer may view.

More particularly, the secure memory 117 may be accessible exclusively to the security CPU-A and CPU-B and to local decompression and rendering engines. Thus, the security CPU-B may decrypt content into this memory region and then local display processes may read the decrypted content for local rendering. None of these steps requires the host processor 110 to have access to the secure memory. The security CPU-B may ensure a secure data flow by decrypting the content into this restricted region, out of reach of the host.

The interrupt controller 140 may be coupled with the security CPU-A and be configured to monitor the on-chip conditions from data generated by the sensors 113. The on-chip sensors 113 may generate data related to attributes of the chip such as, for example, temperature, voltage levels at specific points on the chip, clock speed and the like. If one of these attributes varies too much or in the wrong way, it may be indicative of a potential intrusion or hacker trying to disrupt normal operation of the SOC that would allow access to secure data and/or secure operation. The interrupt controller 140 may aggregate and mask interrupts from other functional blocks of the SOC 100 that may include interrogation of the sensors to detect predetermined threshold values of those sensors for use in determining whether or not the interrupt controller 140 masks an interrupt.

Furthermore, the interrupt controller 140 may generate an interrupt or a hookup in response to detecting conditions indicative of an intrusion. The interrupt or hookup may adjust operation of the host processor 110 or the security CPU-B in real time to ensure secure system operation. The host processor may also have a separate memory buffer than the memory buffer the security CPU-B uses, where the memory buffer for the security CPU-B may be configured as not accessible by the host processor 110 and configured to provide control logic to the second security CPU-B.

The system 100 may communicate over a network 150 such as the Internet or any wide or local area network to communicate with a Web server 155 and media clients 160. The clients 160 may be the customers that procure the SOC system 100 for use by consumers to stream media content to consumer media devices. The security CPU-B may obtain the time and day over the Internet from the Web server 155 using a secure protocol. The time and day may then be considered secure time and be stored by the security CPU-B in either the local SRAM 132 or the secure memory 117 in DRAM 115. So stored, the security CPU-B may prevent access by the host processor or other on-chip programmed components to the secure time, which may be used by digital rights management and other forms of lower level security functions during execution of the secure functions.

Figure 2:
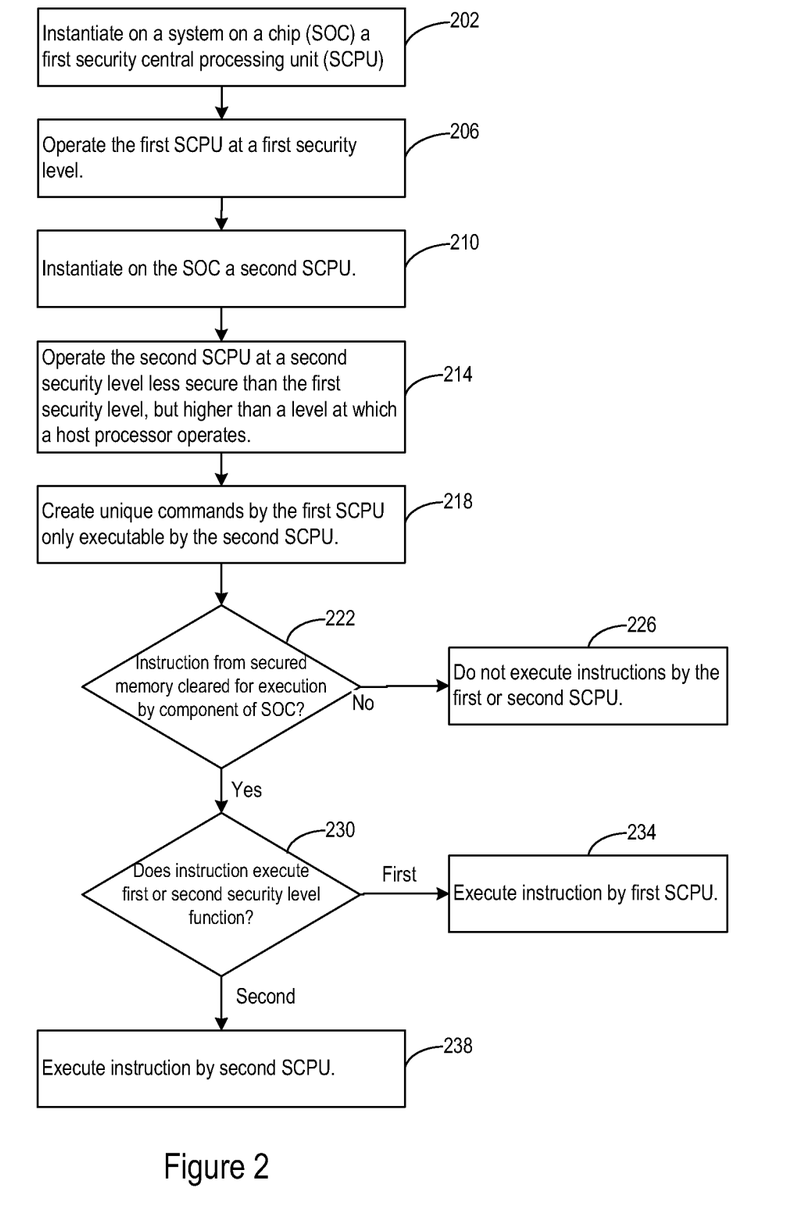
FIG. 2 is a flow chart of an exemplary method for creating the multi-security CPU system on a chip of FIG. 1.

FIG. 2 is an example flow chart of a method for implementing the multi-security CPU system of FIG. 1. A system on a chip (SOC) may include a first security central processing unit (SCPU) and a second SCPU (202, 210). The SOC may operate the first SCPU at a first security level (206). The SOC may operate the second SCPU at a second security level less secure than the first security level, but higher than a level at which a host processor operates (214). The first SCPU may create commands only executable by the second SCPU (218).

The second SCPU may determine whether an instruction called for execution from secured memory is cleared for execution by a component of the SOC calling the instruction (222). If the component is not cleared to execute the instruction, neither the first nor the second SCPU are permitted to execute the instruction (226). If the component is cleared to execute the instruction, the second SCPU may determine whether the instruction executes a first or the second security level function (230). If the component requests to execute a first security function, the first SCPU executes the instruction (234). If the component requests to execute a second security function, the second SCPU executes the instruction (238). The first SCPU may also be the requestor component of either the first or second security functions and the second SCPU may be the requestor component of either first or second security functions, depending on the function.

Figure 3:
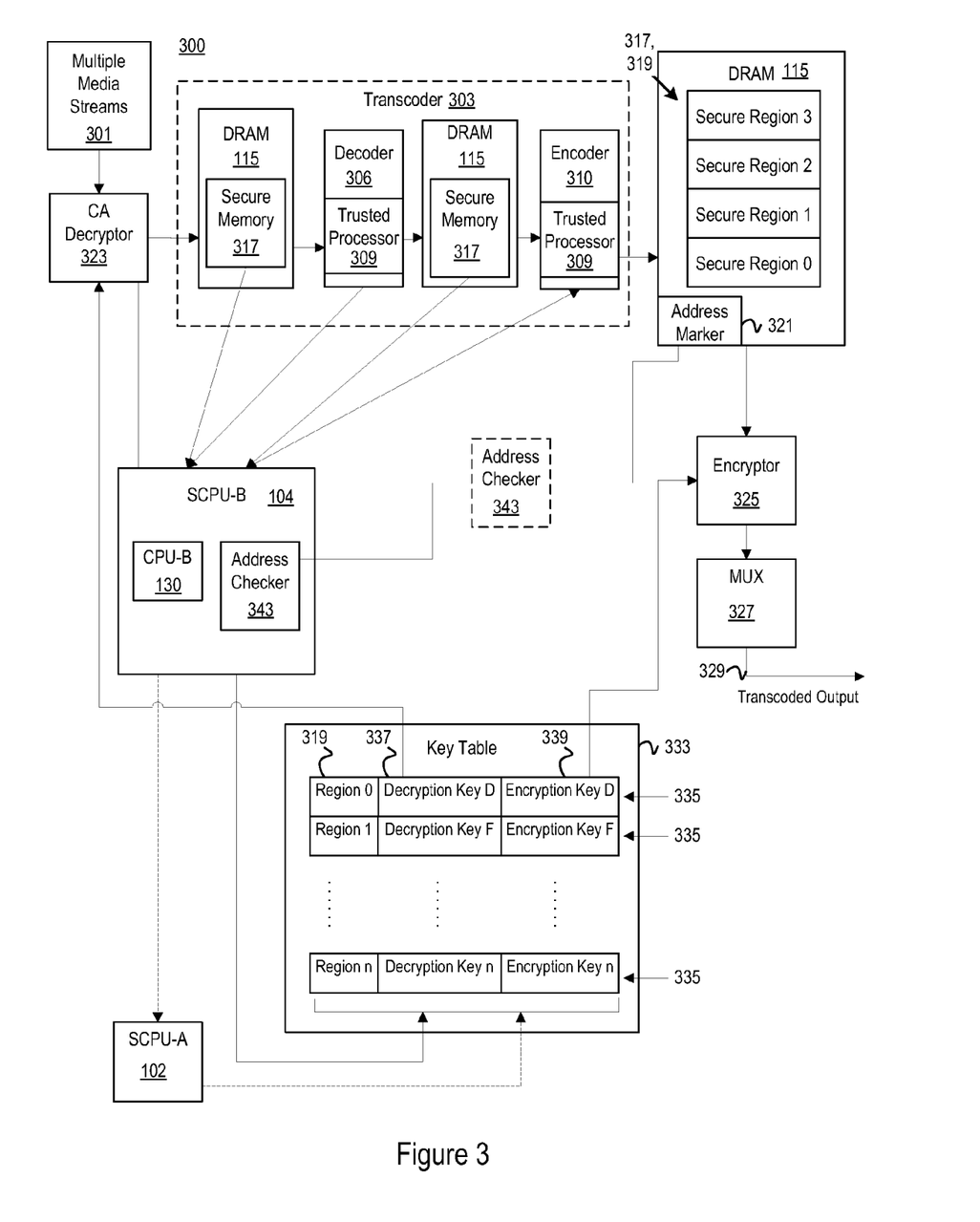
FIG. 3 is a block diagram of an exemplary system for managing a transcoder pipeline.

FIG. 3 is a block diagram of an exemplary system 300 for managing a transcoder pipeline in which multiple media streams 301 coming into the system 300 to be transcoded before being delivered to a consumer media device. The system 300 may include a transcoder 303 having multiple transcoder stages, including at least a decoder 306 and an encoder 310 interspersed with saves to secure memory 317. At least some of the transcoder stages may include a trusted processor 309. The system 300 also includes the dynamic random access memory (DRAM) 115, a part of which includes the secure memory 317. The secure memory 317 may include multiple numbered regions 319. The DRAM 115 may also include an address marker 321 that may mark addresses associated with each secure numbered region 319.

The system 300 may further include a conditional access (CA) decryptor 323 coupled with the transcoder 302 and an encryptor 325 coupled with the DRAM 115 containing numbered regions 319 of secure memory 317. The system may further include a multiplexer (MUX) 327 to multiplex the streaming media content back into the correct encrypted media stream as a transcoded output 329. For example, the multiplexer may re-combine processed audio with processed video streams. The transcoded output may be delivered to a consumer media device for listening and/or viewing.

The system 300 further includes a key table 333 that may be stored in secure memory on the SOC, such as for instance, in the local SRAM 132, which is most secure. The key table 333 may also be stored encrypted in the DRAM if there are many keys to store and the local SRAM is insufficient. The key table 333 may include multiple slots 335; and, stored in each slot, may include a decryption key 337, an encryption key 339 and one of the numbered regions 319 of secure memory.

The security CPU-B includes the CPU-B 130 and optionally an address checker 343, which may either be integrated with the security CPU-B or located separate from, but coupled with, the security CPU-B. The address checker 343 may check for and confirm that media streamed from the numbered regions 319 of secure memory match the region number 319 as stored in the key table 333.

As a media stream is received, the decryptor 323 reads a decryption key out of the key table with which to decrypt the encrypted media stream. The decrypted media stream is stored in the secure memory 317, as shown, and then the decoder 306 decodes the decrypted media stream and stores the decoded media stream into secure memory 317. After any additional transcoder stages, the encoder 310 reads the processed media stream from the secure memory, and encodes the media stream to produce a transcoded media stream.

What may occur is that the encoder 310 writes the transcoded media stream to secure memory 317 and the encryptor 325 reads the transcoded media stream out of secure memory 317 and encrypts the transcoded media stream with an encryption key 339 read from the key table 333. What sometimes may happen is that the encryptor may be tricked into choosing an unauthorized encryption key in lieu of or in addition to the encryption key intended for use by the media provider. Or, the host may point the transcoded data to a slot that does not require encryption, and thus cause the transcoded data to be outputted in the clear. For proper data rights management, however, a media provider wants only a single encryption key used for a corresponding (or counterpart) decryption key for transcoding integrity and security. If another encryption key is used, that resulting encrypted transcoded stream at the output 329 could be misappropriated. Previously, the host writes a decryption key to the key table at one time and the encryption key at another time, and there may have been no way to firmly link the two to each other and to the transcoded stream being read from secure memory.

Another threat exists where the decryption of an incoming media stream could be directed to another key slot with different rights. Those rights may force decryption on the way into transcoding, but no encryption on the way out of transcoding. Some streams may not be encrypted going out, and those streams may exist in parallel with other streams that require encryption. If the host processor 110 is in charge of routing all data to be encrypted with the key table 333 without the below-proposed hardware checks, then the host processor could route the data that is supposed to be encrypted to a key slot that does not require encryption.

Accordingly, one or both of the security CPUs 102 and/or 104 may manage the transcoding process to address this risk. When a new media stream is received for transcoding, the security CPU-A and/or CPU-B may write the decryption key 337 to be used into a slot 335 of the key table 333 atomically with writing the corresponding encryption key 339 and a numbered region 319 of the secure memory 317. Atomically may refer to writing the keys and the numbered region at the minute level of a single slot 335, not across multiple slots, in such a way that the system 300 cannot use a partially-filled slot for either decryption or encryption. Accordingly, for example, when decryption key D is needed to decrypt an incoming media stream, encryption key D is the counterpart key to be used by the encryptor 325 and is linked within the slot to decryption key D and to Region 0 (zero) of secure memory. In this way, the security CPU may write to the key table so that, when the keys are retrieved, there is no misreading another encryption key, such as encryption key F, or retrieving the incorrect transcoded stream from secure memory, e.g., reading from numbered Region 1 of secure memory when the encryptor 325 should read from Region 0.

Because of its larger size, the security CPU-B may be best equipped to manage tracking data received from the transcoder stages, which allows the security CPU-B to track a context or status of the media stream as it passes through the transcoder pipeline, including where in secure memory the media stream is stored. Because of its higher security, the security CPU-A may be best employed to write the encryption key, the decryption key and the numbered region of secure memory into the slot of the key table. The security CPU-B may, however, manage the entirety of the transcoder pipeline as disclosed herein.

The address checker 343 may aid the security CPU-B in reading or identifying the numbered region 319 of the secure memory as marked by the address marker 321 as the transcoded stream is retrieved from the numbered region 319 of secure memory 317. The address checker may be performed in hardware or software and be configured to confirm for the security CPU-B that the transcoded stream is being read from the correct numbered region 319. In other words, that the numbered region associated with or linked to the decryption and encryption keys 337 and 339 in the key table 333 being used by the decryptor and encryptor, respectively, on the same media stream.

The security CPU-B may be coupled with the trusted processors 309 of the transcoder stages as well as with the secure memory of the DRAM in which the processed and transcoded media streams are stored between stages and before encryption. The security CPU-B may, therefore, receive information from the trusted processors and contextual information from secure memory to track a status of progression of transcoding the media stream.

The security CPU-B may, knowing the context of the media stream before being written to secure memory by the encoder 310, direct the encoder to write the transcoded media stream to the numbered region 319 of secure memory 317 associated with the decryption key 337 in the slot of the key table 333 that was used by the decryptor 323 on that transcoded stream. When the encryptor 325 retrieves the transcoded media stream from a numbered region of secure memory, the security CPU-B, optionally working with the address checker 343, may also ensure the encryption key 339 read from the key table is in the same slot as the numbered region from which the transcoded stream is being retrieved. This tracking ensures that the counterpart decryption and encryption keys are applied to the correct media stream read from the secure memory 317 before encryption, thus working to eliminate risks inherent in the data rights management of previous transcoder pipelines.

If the numbered region 319 of secure memory 317 does not correspond to the numbered region 319 in the slot of the key table associated with the decryption key 337 and/or the encryption key 339 used for that transcoded stream, the security CPU-B may discard at least those parts of the transcoded stream to prevent misappropriation of an incorrectly-encrypted transcoded stream. Likewise, if the encryptor 325 has retrieved the wrong encryption key 339, the security CPU-B may also cause the affected media stream data to be discarded. Continuing with the above example, if the counterpart decryption and encryption keys were labeled "D," trying to encrypt a transcoded stream from Region 1 (instead of Region 0) with encryption key D would cause a discard of the transcoded stream. Furthermore, trying to encrypt a transcoded stream from Region 0 with encryption key F may cause a discard of the transcoded stream. A discard may be temporary until the read from DRAM is corrected, and the correct counterpart encryption key is used.

Figure 4:
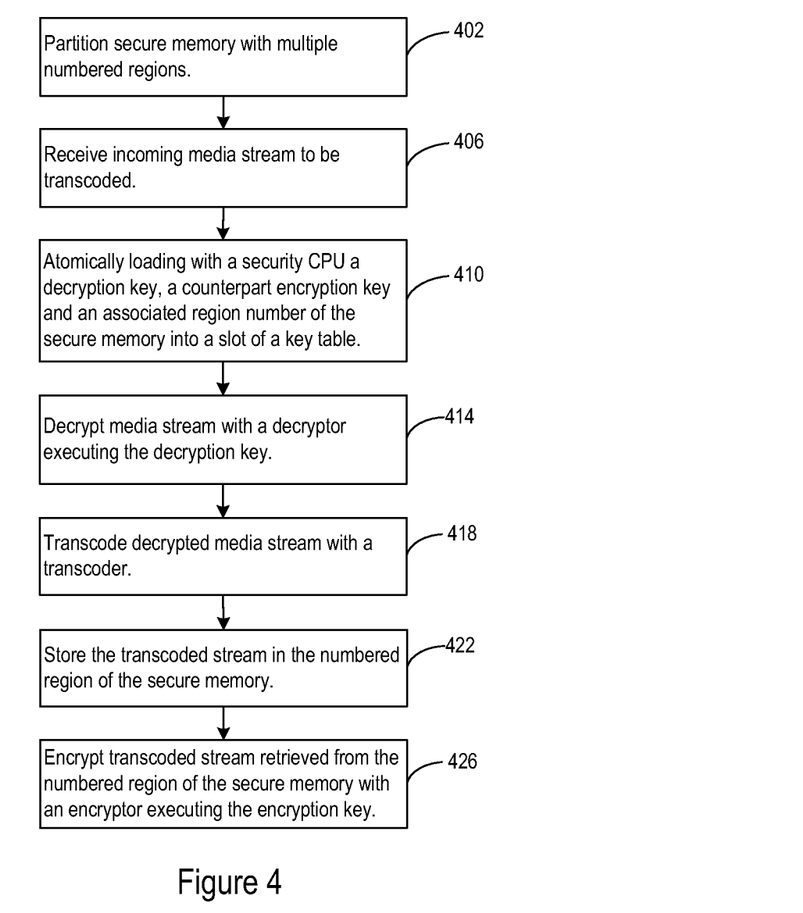
FIG. 4 is a flow chart of an exemplary method for managing a transcoder pipeline.

FIG. 4 is a flow chart of an exemplary method for managing a transcoder pipeline. The security CPU(s) may partition secure memory with multiple numbered regions (402). The security CPU(s) may receive an incoming media stream to be transcoded (406). The security CPU(s) may atomically load a decryption key, a counterpart encryption key and an associated region number of the secure memory into a slot of a key table, the key table providing for selection of decryption and encryption keys before and after transcoding, respectively (410). Atomically loading the decryption and encryption keys and the associated region number may ensure that the encryption key is selected to encrypt a transcoded version of the media stream whenever the media stream has been decrypted with the decryption key and the transcoded media stream is retrieved from the associated region number of the secure memory.

The security CPU(s) may decrypt the media stream with a decryptor executing the decryption key (414). The security CPU(s) may transcode the decrypted media stream with a transcoder to generate the transcoded stream (418). The security CPU(s) may store the transcoded stream in the numbered region of the secure memory (422). The security CPU(s) may encrypt the transcoded stream retrieved from the numbered region of the secure memory with an encryptor executing the encryption key (426).

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system for managing a transcoder pipeline, comprising:
   a transcoder including a transcoder stage to generate a transcoded stream from a decrypted incoming media stream;

a decryptor connected with the transcoder, the decryptor configured to decrypt a media stream with a decryption key and send the decrypted incoming media stream to the transcoder;

a memory connected with the transcoder, the memory including a numbered region to store data from the transcoded stream;

an encryptor connected with the memory, the encryptor configured to encrypt the transcoded stream retrieved from the memory with an encryption key before transmission to a media device, the encryption key corresponding to the decryption key;

a first security central processing unit (SCPU) connected with the encryptor, the decryptor, the memory, and the transcoder, to control processing of the incoming media stream; and a second SCPU configured to atomically load the decryption key, the encryption key, and the numbered region of the memory into a single slot of a key table stored in the memory, to associate the decryption key used by the decryptor with the corresponding encryption key used by the encryptor to encrypt the transcoded stream retrieved from the numbered region of the memory and store data of the transcoded stream into the numbered region of the memory.

2. The system of claim 1, further comprising an address checker configured to:
identify the numbered region of the memory in which data from the transcoded stream is stored; and
provide the identified numbered region to the first SCPU for confirmation of use of the corresponding encryption key by the encryptor to encrypt the transcoded stream.

3. The system of claim 2, where the first SCPU causes data of the transcoded stream to be discarded when the numbered region from which the transcoded stream is retrieved does not match the numbered region of the slot in the key table.

4. The system of claim 2, further comprising an address marker associated with the memory for marking data stored in the numbered region of the memory with the numbered region, for use by the address checker.

5. The system of claim 1, where the first SCPU operates at a first security level and the second SCPU operates at a second security level different than the first security level.

6. The system of claim 1, where the transcoder comprises a trusted processor and the first SCPU is configured to receive information from the trusted processor of the transcoder processing the media stream and from additional memory where the media stream is stored between the transcoder stages.

7. The system of claim 6, where the first SCPU is further configured to track a context of the media stream as the media stream passes through the transcoder.

8. The system of claim 1, further comprising an encoder of the transcoder, and where the first SCPU is further configured to direct the encoder to store the data of the transcoded stream into the numbered region of the memory.

9. A system for managing a transcoder pipeline, comprising:
a memory including a numbered region;
a transcoder connected with the memory, the transcoder including a transcoder stage to generate a transcoded stream from a decrypted incoming media stream, where the transcoder stage includes a processor and the transcoder includes an encoder that stores data from the transcoded stream into the numbered region of the memory;
a first security central processing unit (SCPU) configured to retrieve a decryption key, an encryption key, and the numbered region of the memory, together from a slot of a key table stored in the memory; and
a second SCPU configured to manage a context of the decrypted incoming media stream as the decrypted incoming media stream passes through the transcoder by:
receipt of information from the processor related to the decrypted incoming media stream to track a status of the media stream within the transcoder; and
an instruction to the encoder to save data of the transcoded stream into the numbered region of the memory associated with both the decryption key and the encryption key.

10. The system of claim 9, where the status of the media stream comprises a location in memory to which the decrypted incoming media stream is saved during transcoder processing, where the first SCPU is further configured to atomically load the decryption key, the encryption key and a number of the associated numbered region of the memory into the slot of the key table in an indivisible manner.

11. The system of claim 9, further comprising:
an encryptor connected with the memory, the encryptor configured to encrypt the transcoded stream retrieved from the memory with the encryption key before transmission to a media device, the encryption key corresponding to the decryption key;
an address checker configured to:
identify the numbered region of the memory in which data from the transcoded stream is stored; and
provide the identified numbered region to the second SCPU for confirmation of use of the corresponding encryption key by the encryptor to encrypt the transcoded stream.

12. The system of claim 11, further comprising an address marker associated with the memory for marking data retrieved from a secure region of the memory with a secure region number, for use by the address checker.

13. The system of claim 9, further comprising:
an encryptor connected with the memory, the encryptor configured to encrypt the transcoded stream retrieved from the memory with the encryption key before transmission to a media device, the encryption key corresponding to the decryption key; and
where the second SCPU causes data of the transcoded stream to be discarded the numbered region from which the transcoded stream is retrieved does not match the numbered region of the slot in the key table.

14. A method for managing a transcoder pipeline, comprising:
partitioning a memory with a numbered region;
receiving an incoming media stream to be transcoded, the transcoding controlled by a first security central processing unit (SCPU); and
atomically loading, using a second security central processing unit (SCPU), a decryption key, a counterpart encryption key and an associated region number of the memory into a slot of a key table in a single indivisible operation, the key table providing selection of decryption and encryption keys during transcoding,
where atomically loading the decryption and encryption keys and the associated numbered region ensures that the encryption key is selected to encrypt a transcoded version of the media stream when the media stream has been decrypted with the decryption key and the transcoded media stream is retrieved from the associated numbered region of the memory.

15. The method of claim 14, further comprising:
decrypting the media stream with a decryptor executing the decryption key;
transcoding the decrypted media stream with a transcoder to generate the transcoded media stream;
storing the transcoded media stream in the numbered region of the memory; and
encrypting the transcoded media stream retrieved from the numbered region of the memory with an encryptor executing the encryption key.

16. The method of claim 15, further comprising:
storing the transcoded media stream to the memory; and
managing a context of the media stream within the transcoder by:
  receiving information from a trusted processor of the transcoder related to the media stream to track a status of the media stream within the transcoder; and
  directing an encoder to save data of the transcoded media stream into the numbered region of the memory associated with the encryption key and the decryption key in the slot of the key table.

17. The method of claim 14, further comprising:
encrypting the transcoded media stream retrieved from the numbered region of the memory with an encryptor executing the encryption key;
identifying, using an address checker, the numbered region of the memory in which the transcoded media stream is stored; and
providing the identified numbered region to the first SCPU for confirmation of use of the corresponding encryption key by the encryptor to encrypt the transcoded media stream.

18. The method of claim 17, further comprising marking data of the transcoded media stream with the numbered region where the data is stored, for use by the address checker.

19. The method of claim 17, further comprising discarding data of the transcoded media stream the numbered region from which the transcoded media stream is retrieved does not match the numbered region of the slot in the key table.

* * * * *